Jan. 30, 1968 J. F. HUGHES, JR., ET AL 3,366,559
METHOD FOR TREATMENT OF LIQUIDS WITH ADSORPTIVE
NON-METALLIC ELECTRODES
Original Filed April 2, 1959
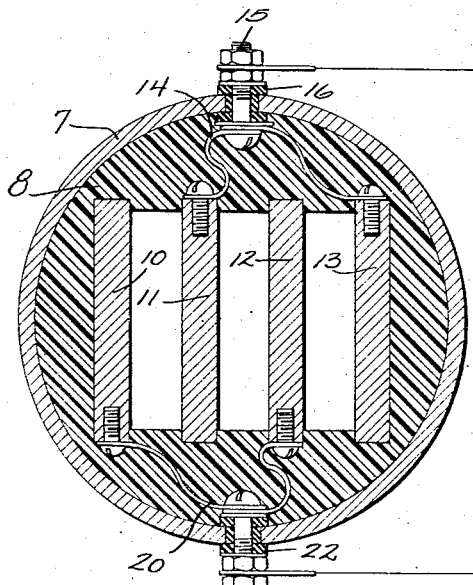
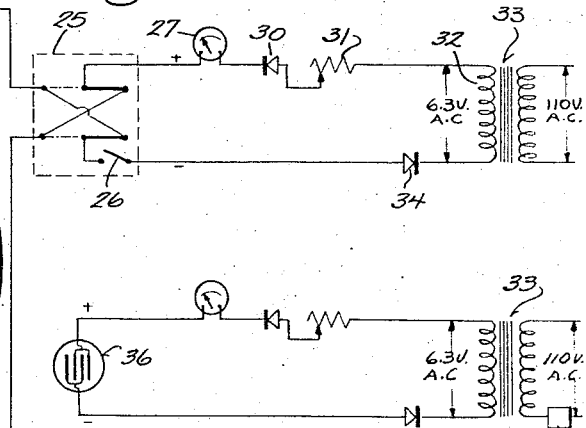
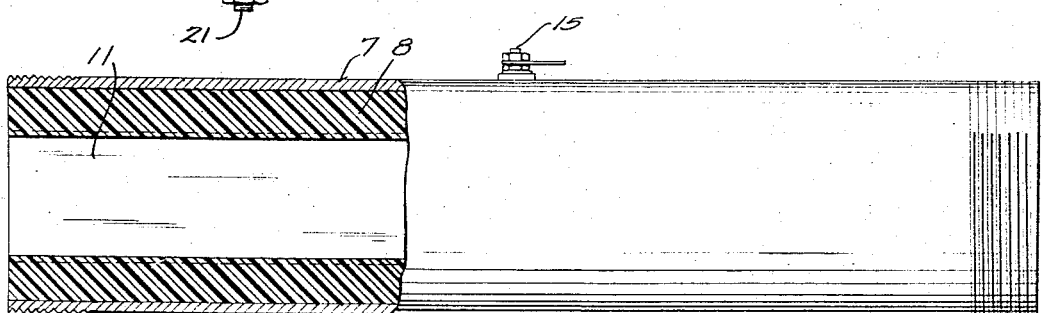
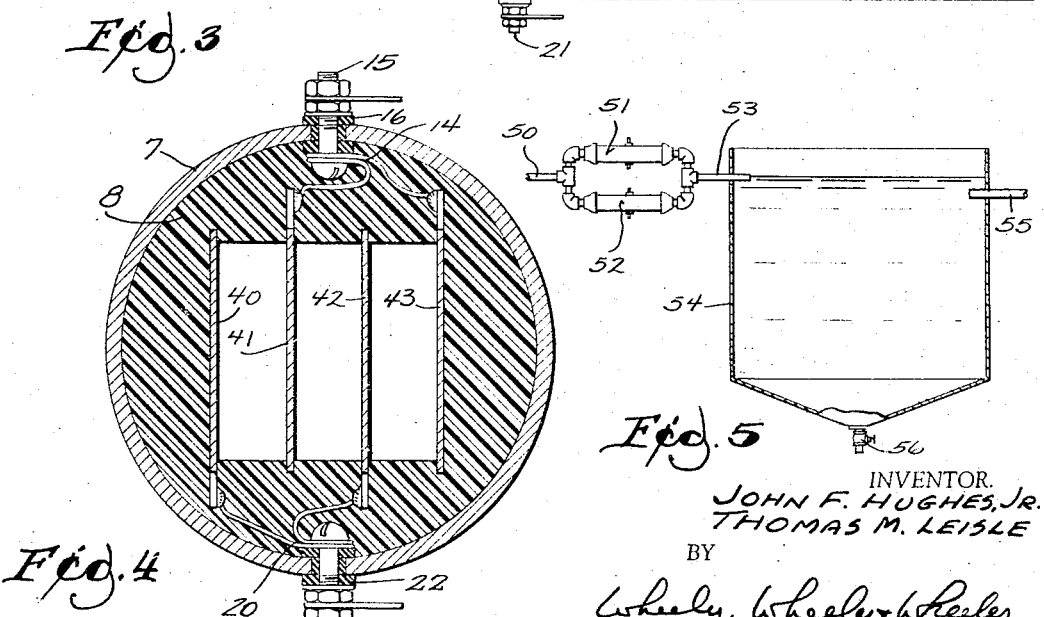
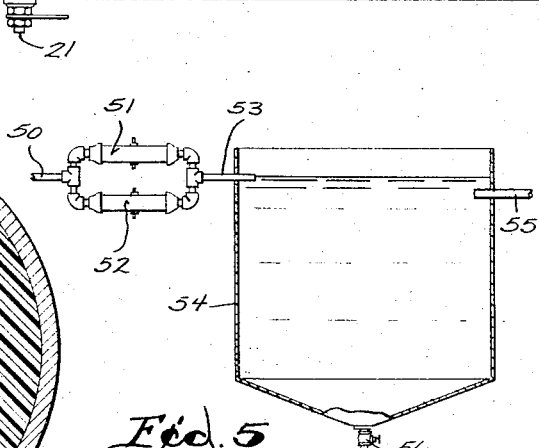
INVENTOR.
JOHN F. HUGHES, JR.
THOMAS M. LEISLE
BY
Wheeler, Wheeler & Wheeler
ATTORNEYS United States Patent Office 3,366,559
Patented Jan. 30, 1968

3,366,559
METHOD FOR TREATMENT OF LIQUIDS WITH ADSORPTIVE NON-METALLIC ELECTRODES
John F. Hughes, Jr., 3 Ligustrum Circle, and Thomas M. Leisle, Rte. 1, Box 101B, both of Ormond Beach, Fla. 32074
Continuation of application Ser. No. 803,620, Apr. 2, 1959. This application Sept. 14, 1964, Ser. No. 398,474
17 Claims. (Cl. 204—149)

This is a continuation of parent application Ser. No. 803,620, filed Apr. 2, 1959 in the name of John F. Hughes, Jr. and Thomas M. Leisle, now abandoned.

This invention relates to apparatus and a method for treating liquids and liquid borne gases and minerals for changing the heretofore expected effect of such gases and minerals in the liquid.

In our Patent 2,864,750 we disclosed an apparatus and method for reducing the corrosion and scale-forming properties of gases and minerals in water and removing scale already formed, and involving the use of electrodes of different but particularly defined materials, to which direct current is applied at low potential and current, and means for reversing the applied E.M.F. in predetermined cycles so that differing and modified electrode-liquid interfaces are obtained.

We have now found that generally similar apparatus and method can be used with like electrodes, i.e., either all "non-metallic conductor" electrodes or all "adsorptive metal" electrodes, the results differing from those disclosed in the patent as well as differing between our all non-metal and all metal electrode structures. Thus the all non-metallic electrode construction allows us to put the minerals in a form or condition in which they no longer have the effects which were heretofore known and expected but in which the appearance and some other physical properties of the solution are changed. Such changes are indicated by change in pH, the continuation of or increase in turbidity and suspended flocculation, and the polarographic determination of the presence of the perhydroxyl ion, $HO_2$. The use of our all metallic electrode construction substantially reduces the effects of hardness in the solution. Such change is indicated by a change in pH and by increased clarity of the solution.

With all non-metallic electrodes the results indicate that the content of gases is decreased while with all metallic electrodes the number of anions is reduced. Hence, we can use the devices disclosed herein for keeping the gases and minerals in solution in a form which changes their usual effects or we can put the gases and minerals into a form in which they can be mechanically removed from the solution. Thus the non-metallic electrode device is particularly useful for purification of exceedingly dilute solutions and for the recovery of valuable minerals from very dilute solution. The changes in composition as between that of the original solution and the precipitates and liquid of the treated solution can all be shown by standard chemical tests.

In the drawings:

FIGURE 1 is a cross section through a device using all non-metallic electrodes only and to which direct current is supplied by an electric circuit which is schematically shown;

FIGURE 2 is a modified form of the electric supply circuit;

FIGURE 3 is a longitudinal section through the device of FIGURE 1;

FIGURE 4 is a view similar to FIGURE 1 but using all metallic electrodes only. This view omits the electric circuit of FIGURE 1; and FIGURE 5 diagrammatically illustrates an installation using two of our units which are oppositely connected and are particularly effective in softening water of high hardness.

Referring to the drawings, numeral 7 designates a pipe-like outer shell which may be of metal or non-metal, within which electrodes are held in place by any non-conductive material 8 inert to the solution to be treated and the gases contained therein and which can be cast or otherwise formed into place. Non-metallic electrodes 10, 11, 12 and 13 are held in the insulation 8 to co-act therewith in defining passages for the flow of solution therethrough. The electrodes in the units herein disclosed for treatment of flow in pipes up to two inches diameter, are spaced to bring their opposite surfaces approximately ½ inch apart, but the spacing of electrodes in other size units may be different. The resistance and character of the solution are also considerations in determining this spacing. The electrodes 11 and 13 are both connected to the one side of a D.C. supply circuit by a connector 14 and a terminal 15 passing through insulation 16 in an aperture in the pipe 7, which may be selected to be either the anode or the cathode in the system. Electrodes 10 and 12 are joined to the supply circuit by connector 20 and terminal 21 extending through insulation 22 in an aperture through the pipe 7, and form the other side of the system.

Terminals 15 and 21 are connected through a circuit reversing timer 25 having a cut-off switch 26 and through a microammeter 27 which may be placed in the system only at the time of initial adjustment of the system for operation and when operation is to be checked or it may be left permanently in the system. A half-wave rectifier 30 and a variable resistor 31 (either inductive or non-inductive) of 500,000 ohms are connected to one terminal of a secondary winding 32 of a transformer generally designated 33, which receives alternating current at 110–120 v. and reduces potential to approximately 6.3 v. at the secondary winding terminals. Terminal 21 is connected through another half-wave rectifier 34 to another terminal of secondary winding 32. Of course, other sources of direct current may be used to provide the necessary values of potential and current.

The circuit in FIGURE 2 is another means for impressing voltage on our unit but without breaking the D.C. circuit connections, the A.C. circuit being interrupted and thereby reversing the polarity of the electrodes electrolytically. The unit is now diagrammatically indicated at 36. The timer 25, 26 of FIGURE 1 is now omitted and a different timer 37 is placed in the primary winding connections of transformer 33. The timer 37 does not have a reversing switch but operates only a disconnect switch so that the A.C. circuit may be interrupted.

The structure shown in FIGURE 4 is similar to that above described except that metallic electrodes 40, 41, 42 and 43 are here used. Again, two of the electrodes are interconnected and connected to the positive side of the electric supply circuit and two electrodes are connected to the negative side of the circuit. It will be obvious that either of the devices may contain any number of electrodes required to define a sufficient number of passages at the desired spacing of the plates for the flow of the desired amount of the solution, it being necessary only that an anode and a cathode be placed in opposite positions for the flow of solution in contact therewith.

Any combination of the units described herein and the unit described in our earlier patent may be used in the combination shown in FIGURE 5, particularly for softening hard water. A water supply line 50 is connected with units 51 and 52 arranged in parallel and the units discharge into a common line 53. The water is discharged into settling tank 54 adjacent to the top of the tank and in such way as to cause a minimum of disturbance in the water already in the tank, and the water is drawn off by way of a pipe 55 slightly below the level of the pipe 53. The tank preferably has a conical bottom with a valve 56 by which the precipitation is drawn off even though in the form of a heavy sludge. Obviously other mechanical separating devices can be used.

The non-metallic electrode materials are those metalloids which are electric conductors, are non-ionizable in solution and are capable of adsorbing considerable amounts of gases and other substances. In both our previous patent and in this disclosure, we refer to this material as a "non-metallic conductor." We prefer to use a carbonaceous type of material. The metallic electrodes are made of a metal, or alloy which contains a metal or metals of the transition groups of the Periodic Table characterized by incomplete inner shell energy levels ("$d$" electrons) and unfilled "$d$" energy bands. It is preferable that the metallic electrodes be non-magnetic. In our earlier patent and in this disclosure, we refer to this material as "adsorptive metal." The electrodes have the ability to adsorb substantial quantities of gases and other substances. The pipe used is preferably iron.

We have found that all desired results are obtained when voltages are applied ranging from .013 upwards (the full output voltage of the electric supply circuit is limited to 6.3 v.). The water from the city water supply at Jacksonville, Fla. has been effectively treated at .52 v. while .5 v. has been used in treating the water supplied by the city of Daytona Beach. The amount of electric current supplied depends on the particular solution to be treated and the particular result desired, i.e., whether we desire it to retain the minerals in the liquid and merely change their properties as when treated water is to be used both for drinking and rinsing glassware which is to be air-dried without spots, or whether the minerals are to be actually removed from the liquids. Thus for units passing sufficient water to fill a one inch discharge line, we have successfully used more than 200 $\mu$a. with all non-metal electrodes and 20 $\mu$a. with all metal electrodes at Daytona Beach, Fla., and over 500 $\mu$a. in a unit with non-metallic and metallic electrodes treating the water in a three inch supply line at Atlantic Beach, Fla.

In use, our units when all non-metallic electrodes are used convert some of the minerals into oxalates some of which are visible in the water and make the water turbid. Chemical analysis shows that gas content, particularly $CO_2$ and $O_2$, decreases and a polarograph shows the presence of the perhydroxyl ion, $HO_2$. When the applied E.M.F. is removed in such a way as to eliminate the impressed potential and also as to remove the external connection between the electrodes, so that the charge which voltmeters and ammeters indicate is built up between the electrodes is not drained off through the external circuit, the turbidity-causing mineral oxalates precipitate, leaving the liquid clear. When all metallic electrodes are used, some of the anions are reduced, e.g., the bicarbonate anion to the bipercarbonate anion which, when it combines with a cation such as Ca or Fe, is in such highly solvated form that the liquid becomes and remains clear. In both units described herein and in the unit described in our previous patent, some dissolved gases in the water, such as oxygen, carbon dioxide and hydrogen sulfide, are changed or eliminated so that all units may be used as simpler means of treating gaseous water than the means heretofore used for that purpose.

When a unit is put in service, the polarity is cycled back and forth so that the adsorbed substances may be modified by oxidation and reduction to provide the most efficient condition at the electrode interfaces. When the current is applied to a unit, a layer of oxygen accumulates on the anode. After sufficient time to make the oxygen layer substantially complete, the electric connections are reversed and the anode now becomes the cathode so that the oxygen is adsorbed thereto. The adsorbing action is instantaneous so far as we have been able to determine and the unit now continues to produce the desired results. When the adsorbed oxygen on the cathode diminishes, the unit gradually becomes less effective as the adsorbed oxygen is utilized. However, while the adsorbed oxygen on the cathode is being used up, a layer of oxygen is accumulated on the then anode so that reversal of connections for reversing polarity of the electrodes again causes adsorption of the oxygen accumulated on the then cathode and the device remains in operation except for the negligible time during which the connections are being changed. All of our units must have periodic reversals of polarity to remain effective. However, to maintain continuity of results, the electrodes must be of the same composition, which differentiates the results obtained from the units disclosed herein from the results obtainable from the unit of our prior patent.

Scale deposited prior to use of our units is gradually removed and no further scale is formed. In one water system, scale was progressively removed in excess of two miles downstream from the unit. In such a system, flushing operations were required from time to time at progressively greater distances from the unit.

In addition we find that our units produce a coating over even corroded metal in the distribution system. The coating is very thin and is barely visible and feels slippery (soapy) when wet. When dry, the coating has a whitish color and is somewhat powdery like calcimine. Experience shows that the coating inhibits corrosion of metals and that continued deterioration of already corroded spots is retarded.

The use of two units in parallel as shown in FIGURE 5 is effective in softening water as we have shown with water of 200 p.p.m. hardness. The minerals producing water hardness continuously precipitate as the output from the two units is mixed and the precipitates settle in the tank from which supernatant clear water is drawn. We prefer that the tank be so constructed that the water enters in a way to cause a minimum of turbulence in the tank and that the precipitates can be drawn off without disturbing the settling action in the upper portions of the tank.

We have found that the above results are obtained when we use two units shown in our earlier patent and which are connected for opposite polarity.

When we use our new units in parallel, the results depend on the combination of units used and the manner of operating them, but is best illustrated by examples of various combinations. With two units each having all non-metallic electrodes, we obtain turbid water with the minerals precipitated in the water as oxalates and a water softening effect. However, when the circuit to one of such all non-metallic electrode units is interrupted, we obtain a water mixture from the two units which is less turbid and is substantially softer. With two units each having all metallic electrodes, we obtain a clear water mixture, the minerals being in a highly solvated condition, but only a limited softening effect. But when the circuit to one of the all metal units is interrupted, the mixture of the water has a light precipitate of oxalates and carbonates.

With two units severally having all non-metal electrodes and all metal electrodes, we obtain a water mixture which is substantially softened and is somewhat turbid. When the circuit to the all metal electrode unit is interrupted, we obtain a substantial softening effect and the water mixture is somewhat turbid. But when the circuit to the all non-metal unit is interrupted, we obtain a clear water mixture with some softening effect. The combination of the units used depends on the water content of $CO_2$ and the bicarbonates and the calcium and magnesium salts present, the non-metallic electrode unit being more effective in utilizing the $CO_2$ content and the all metallic electrode unit being more effective in converting the anions in the water.

Our all non-metallic electrode units are more effective than the other units in dissipating gases dissolved in the liquid while conversion of anions is more effectively done by our all metal electrode units than by the other units.

In all cases a pH change occurs which varies from 4.6 to 9.6 so that chemical reactions are obviously taking place.

In all cases the end results of such reactions are identifiable by standard chemical tests even though the physical properties of the solution remain unchanged in some operations.

There is a marked difference in the results obtained from the use of our metal electrodes made of adsorptive metal as contrasted with the all non-metallic conductive electrodes. The adsorptive metal electrodes produce a highly solvated mineral tending to remain in solution with the water non-turbid. On the other hand, with the all non-metal electrodes, for instance, the mineral contents of the water tend to remain in suspension and the treated water is then turbid.

Therefore, there are differences in the manner in which we control the cycles of operation of the respective units. If the electrodes are all metal, we can control them on an instantaneous reversal of polarity of the respective electrodes, or we can, by breaking the circuit, permit precipitation of the solvated substances and the precipitation will be in the form of oxalates and carbonates. If the electrodes are non-metallic, we can interpose a short period of open circuit at which time, for a certain mineral content of the water being treated, there is a precipitation of solids as oxalates, during the time the circuit is open.

In another instance, where iron is present along with other minerals such as calcium in one of its many compounds, the "off" or open circuit position, after a period of circuit closed operation, will result in precipitation of the iron.

Successful softening of water is also attainable through the use of our unit described in our earlier patent in a system and process in which a quantity of water is treated and then divided or segregated. The unit is then reversed as to its polarity and the treatment is continued with this last treated water mixed with the segregated water. As these differently treated waters are mixed, the softening takes place and precipitation gradually occurs.

Softening effects can be obtained by using units having our all adsorptive metal electrodes, or units having our all non-metallic conductor electrodes by operating at one polarity, reversing the polarity for a period and then adding a period of open circuit. Precipitation from the mixture of waters from the all metal units is from a clear solution; whereas, the precipitation from the all non-metallic units is from a turbid solution.

We claim:

1. The method of treating an aqueous solution for the softening and removal of previously deposited scale wetted by said solution which comprises exposing said solution between spaced adsorptive non-metallic conductor electrodes, impressing a direct current potential of .013 to approximately 1.0 volt on a circuit including said electrodes, whereby one of said electrodes is positive and another of the said electrodes is negative, and then reversing the current in said circuit.

2. The method of treating a mineral bearing aqueous solution for preventing the formation of scale therefrom which comprises exposing said solution between spaced adsorptive non-metallic conductor electrodes, impressing a direct current potential of .013 to approximately 1.0 volt on a circuit including said electrodes, whereby one of said electrodes is positive and another of said electrodes is negative, and then reversing the current in said circuit.

3. The method of treating an aqueous solution for removing the iron content thereof which comprises passing said solution between adsorptive non-metallic conductor electrodes, and, in cycles, impressing a direct current potential of .013 to approximately 1.0 volt between said electrodes in a circuit including said electrodes and said solution, whereby one of said electrodes is positive and another of said electrodes is negative, breaking the circuit for a period of time, and then reversing the polarity of said electrodes to precipitate said iron content in the form of sludge.

4. A method of forming a coating on a surface wetted by a mineral bearing aqueous solution which comprises exposing said aqueous solution between spaced adsorptive non-metallic conductor electrodes, impressing a direct current potential of .013 to approximately 1.0 volt on a circuit including said electrodes, whereby one of said electrodes is positive and another of said electrodes is negative, and then reversing the polarity of the current in said circuit.

5. A method of forming a coating on a surface wetted by a mineral and organic substance bearing aqueous solution which comprises exposing said aqueous solution between spaced adsorptive non-metallic conductor electrodes, impressing a direct current potential of .013 to approximately 1.0 volt on a circuit including said electrodes, whereby one of said electrodes is positive and another of said electrodes is negative, and then reversing the polarity of the current in said circuit.

6. The method of treating water for the removal of gases therefrom and for rendering inert other foreign substances therein which comprises exposing said water between spaced adsorptive non-metallic conductor electrodes, impressing a direct current potential of .013 to approximately 1.0 volt on a circuit including said electrodes, one set of electrodes being positive and another set of electrodes being negative, interrupting the circuit, reversing the polarity of the electrodes in said circuit, and re-establishing the direct current potential therein.

7. The method of treating an aqueous solution which comprises exposing said aqueous solution between spaced adsorptive non-metallic conductor electrodes, impressing a direct current potential of .013 to approximately 1.0 volt on a circuit including said electrodes, whereby one of said electrodes is positive and another of said electrodes is negative, and then reversing the current in said circuit.

8. The method of claim 7 further comprising the reversing of the polarity of the current in repetitive cycles.

9. The method of treating an aqueous solution which comprises exposing said aqueous solution between spaced adsorptive metalloid conductor electrodes, impressing a direct current potential of .013 to approximately 1.0 volt on a circuit including said electrodes, whereby one of said electrodes is positive and another of said electrodes is negative, and then reversing the current in said circuit.

10. The method of treating an aqueous solution which comprises exposing said aqueous solution between spaced adsorptive carbonaceous conductor electrodes, impressing a direct current potential of .013 to approximately 1.0 volt on a circuit including said electrodes, whereby one of said electrodes is positive and another of said electrodes is negative, and then reversing the current in said circuit.

11. The method of treating an aqueous solution containing carbon dioxide to produce oxalates which comprises placing said solution between adsorptive non-metallic conductor electrodes, impressing a direct current potential of .013 to approximately 1.0 volt on a circuit including said electrodes, said electrodes being connected with opposite polarity, reversing the polarity of said electrodes, and impressing said potential on said circuit for another period of time.

12. The method of treating an aqueous solution containing carbon dioxide to produce and precipitate oxalates therefrom which comprises placing said solution between adsorptive non-metallic conductor electrodes, impressing a direct current potential of .013 to approximately 1.0 volt on a circuit including said electrodes, said electrodes being connected with opposite polarity, breaking said circuit for a period of time, reversing the polarity of said electrodes, and impressing said potential on said circuit for another period of time.

13. The method of treating an aqueous solution for reducing the gas content thereof which comprises exposing said solution between spaced adsorptive non-metallic conductor electrodes, impressing a direct current potential of .013 to approximately 1.0 volt on a circuit including said electrodes, whereby one of said electrodes is positive and another of said electrodes is negative, and then reversing the current in said circuit.

14. The method of softening water which comprises exposing said water between spaced adsorptive non-metallic conductor electrodes, impressing a direct current of .013 to approximately 1.0 volt on a circuit including said electrodes, said electrodes being connected with opposite polarity, reversing the polarity of said electrodes for a period of time, and then opening the circuit for a period of time.

15. The method of demineralization of mineral bearing water which comprises exposing said water between adsorptive non-metallic conductor electrodes, impressing a direct current potential of .013 to approximately 1.0 volt on a circuit including said electrodes, said electrodes being connected with opposite polarity, reversing the current in said circuit, and mechanically removing the collected minerals.

16. The method of softening a mineral bearing aqueous solution which comprises exposing said solution between spaced adsorptive non-metallic conductor electrodes, impressing a direct current of .013 to approximately 1.0 volt on a circuit including said electrodes, said electrodes being connected with opposite polarity, reversing the polarity of said electrodes, and mechanically removing the resultant precipitation.

17. The method of demineralization of a mineral bearing aqueous solution which comprises exposing a first quantity of said aqueous solution between adsorptive non-metallic conductor electrodes, impressing a direct current potential of .013 to approximately 1.0 volt on a circuit including said electrodes, separating the treated aqueous solution and reversing the polarity of said electrodes, exposing a second quantity of said aqueous solution between adsorptive non-metallic conductor electrodes, impressing a direct current potential of .013 to approximately 1.0 volt on a circut including said electrodes, and finally mixing the thusly treated first and second quantities of aqueous solution.

References Cited
UNITED STATES PATENTS

| | | | |
|---|---|---|---|
| 478,048 | 6/1892 | Collins | 204—149 |
| 1,146,942 | 7/1915 | Landreth | 204—149 |
| 2,864,750 | 12/1958 | Hughes et al. | 204—149 |

HOWARD S. WILLIAMS, *Primary Examiner.*

WINSTON A. DOUGLAS, JOHN H. MACK,
*Examiners.*

T. TUNG, *Assistant Examiner.*